United States Patent [19]

Yoshino et al.

[11] Patent Number: 4,937,696
[45] Date of Patent: Jun. 26, 1990

[54] PROTECTION CIRCUIT FOR A SEMICONDUCTOR DEVICE

[75] Inventors: Hisashi Yoshino; Noburu Fukushima; Masakatsu Haga, all of Tokyo; Masachika Iida, Kuwana; Sadaaki Mori, Mie, all of Japan

[73] Assignee: Kabushiki Kaisha Toshiba, Kawasaki, Japan

[21] Appl. No.: 351,300

[22] Filed: May 11, 1989

Related U.S. Application Data

[63] Continuation of Ser. No. 188,757, May 2, 1988, abandoned, which is a continuation of Ser. No. 941,808, Dec. 15, 1986, abandoned.

[30] Foreign Application Priority Data

Dec. 23, 1985 [JP] Japan .................................. 60-290219
May 30, 1986 [JP] Japan .................................. 61-124917

[51] Int. Cl.⁵ .............................................. H02H 3/08
[52] U.S. Cl. ........................................ 361/11; 361/23; 361/58; 361/106
[58] Field of Search ........................ 361/10, 11, 27, 29, 361/58, 99, 102, 103, 106

[56] References Cited

U.S. PATENT DOCUMENTS

| | | | |
|---|---|---|---|
| 3,249,810 | 5/1966 | Strom et al. | 361/11 |
| 3,697,863 | 10/1972 | Kilner | 361/106 |
| 4,198,669 | 4/1980 | Kulwicki | 361/29 X |
| 4,574,229 | 3/1986 | Kim | 361/27 X |
| 4,583,146 | 4/1986 | Howell | 361/11 |
| 4,642,136 | 2/1987 | Fukushima et al. | 75/234 |

FOREIGN PATENT DOCUMENTS 0037859 10/1981 European Pat. Off. .

OTHER PUBLICATIONS

IEEE Trans. CHMT-5, 225 (1982), R. S. Perkins, et al.

Primary Examiner—Todd E. Deboer
Attorney, Agent, or Firm—Oblon, Spivak, McClelland, Maier & Neustadt

[57] ABSTRACT

A protection circuit for a semiconductor device is disclosed. This circuit is connected in series with a power semiconductor device to be protected, and is comprised of a circuit breaker and current-limiting device. The current-limiting device limits the overcurrent, thereby providing a time allowance until the circuit breaker begins operate.

10 Claims, 3 Drawing Sheets

PROTECTION CIRCUIT FOR A SEMICONDUCTOR DEVICE

This application is a continuation of application Ser. No. 188,757, filed on May 2, 1988, which is a continuation of Ser. No. 06/941,808 filed on December 15, 1986 both now abandoned.

BACKGROUND OF THE INVENTION

1. Field of the Invention

This invention relates to a protection circuit for a semiconductor device and, in particular, to a circuit for protecting from an overcurrent, a power semiconductor device for use as a switching device, etc., especially a large-current type.

2. Prior Art

In addition to a conventional contact-equipped switch heretofore used, a contactless type semiconductor switch has recently been employed as a device for effecting on-off control of an electric circuit through which a large current flows. This type of switch has the advantages of being free from arcing, noises, and the need for maintenance, but is easily destroyed in the face of an overcurrent, that is, an abnormal current such as a short-circuiting current. For example, if a current exceeding a prescribed level flows through a thyristor constituting a semiconductor switch, then the thyristor is destroyed, producing a fixed "on" state.

In order to prevent the destruction of a semiconductor switch, a quick-break fuse is inserted into the electric circuit whereby, upon the flow of an overcurrent, the circuit is interrupted for the protection of the semiconductor switch. An attempt has also be made, in this field of art, to protect a semiconductor switch by using a contact breaker in place of a quick-break fuse.

However, when the quick-break fuse is broken due to an overcurrent, then it should be replaced by a new one, in order to restore the circuit to its normal state, and this poses a burdensome maintenance problem.

Furthermore, in order for the breaker's contact to be opened for protection of the device, a mechanical operation is involved, causing a time delay to occur from the generation of an overcurrent to the interruption of current flow in the circuit. Therefore, an adequately fast response cannot be obtained, which is required for the protection of a semiconductor device.

SUMMARY OF THE INVENTION

One object of this invention, as conceived with the aforementioned situations in mind, is to provide a protection circuit for a semiconductor device, whereby even if an overcurrent such as a short-circuiting current flows, an associated circuit is rapidly turned off to positively protect a semiconductor switch, and that circuit can readily be restored to a normal state.

Another object of this invention is to provide a PTC (Positive Temperature Coefficient) resistor suitable as a current-limiting device constituting the aforementioned protection circuit.

The aforementioned first object of this invention is achieved by a protection circuit connected in series with a power semiconductor device to be protected, and comprised of a series array of a circuit breaker and a current-limiting device.

It is preferable that, as a current-limiting device, use be made of a ceramics-type PTC resistor whose resistance increases abruptly with a rise in temperature. A corundum-type structure is particularly preferable as such, having a composition of $$(V_{1-x}A_x)_2O_3$$

where
A is one element selected from the group consisting of Cr, Al, and Sc; and
x is a molar ratio of $0 \leq x \leq 0.02$ This corundum-type is preferable because it has the advantages of having a resistance of $10^{-3}$ Ω.cm at normal temperature, it experiences a smaller heating loss in a normal conduction time, and possess a high response characteristic, which increases its resistance from $10^{-3}$ to $10^{-1}$ Ω.cm at about 100° C. As the PTC resistor, on the other hand, use is rather made of BaTiO$_3$ of an ordinary perowskite structure which has a greater resistance of $10^1$ to $10^2$ Ω.cm at normal temperature. In order for BaTiO$_3$ to be used as the current-limiting device, a thinner film should be used, so that the resistance may be made smaller.

The current-limiting device having a composition of $$(V_{1-x}A_x)_2O_3$$

will be explained below in more detail. Cr, Al, and Sc in this general formula, are additive elements necessary for exhibiting the PTC characteristic, and V atoms are substituted by the additive elements in the crystal lattice structure. When the molar ratio x exceeds 0.02, the current-limiting device maintains a high resistance state, thus failing to exhibit the PTC characteristic. More preferable range of x is $0 \leq x \leq 0.001$. The sintering property of the PTC resistor can be improved by the addition of below 20% by weight of at least one of Fe, Cu, Ni, Co, and Sn. Sn is most desirable for improving the PTC characteristics. If the amount of additive exceeds 20% by weight, the PTC scale factor is lowered. Most preferably, the amount of additive is 2 to 15 percent by weight. The addition of W or Mo can reduce the crystal grain size of the sintered body, thus exhibiting an adequate resistance to thermal shock, even when the resistor is abruptly heated by an overcurrent.

Of the additive metals considered suitable for improving the sintering property of the PTC resistor, Sn in particular, improves the PTC characteristic. Sn is stable as a metal in a sintering atmosphere at a sintering temperature of 1400° to 1600° C., and is present as a liquid phase among the grains of the metal oxide indicated by the aforementioned general formula, and thus facilitates a sintering-acceleration. In the sintered body, the Sn-deposited phase serves to reduce the resistivity of a low-resistant region, in relation to the PTC characteristic, thus improving the PTC scale factor and increasing the current capacity. Furthermore, the addition of Sn, unlike that of the other sintering acceleration metals, never causes a variation in the transition temperature indicative of the PTC characteristic.

Another object of this invention is to provide a PTC resistor, suitable as a current-limiting device constituting the aforementioned protection circuit, in which the resistor elements are connected in parallel array with the cross-sectional areas of the resistor elements set to be 5 to 100 mm$^2$ each, noting that the PTC resistor is comprised of $$(V_{1-x}A_x)_2O_3.$$

The PTC resistor has a PTC characteristic suitable as the aforementioned current-limiting device, furthermore has an adequate resistance to thermal shock, and to cracking, even if it is abruptly heated by a short-circuiting current. In order to provide an adequate resistance to thermal shock, the cross-sectional area of the PTC resistor elements should be formed to have an area of less than 100 mm². If the cross-sectional area exceeds this value, it is not possible to attain a satisfactory resistance to thermal shock. This cross-sectional area requirement is first ascertained by passing a large current of 50 Hz through the PTC resistive elements of various cross-sectional areas in a conduction cycle of ½, and thereby determining the relation of the cross-sectional area to the current density which leads to the destruction of the resistor element. This relation is shown in FIG. 4. As is evident from FIG. 4, when the cross-sectional area is less than 100 mm² the maximum current density is increased abruptly, exhibiting great resistance to thermal shock. When the cross-sectional area is less than 5 mm², resistance to thermal shock is better, making it very difficult to manufacture a PTC resistor with electrodes attached to a combination of resistor elements. Furthermore, handling difficulty also occurs in this case. It is, preferable that the resistor elements be formed to have a cross-sectional area within a range of 5 to 50 mm².

DETAILED DESCRIPTION OF THE PREFERRED EMBODIMENTS

Figure 1:
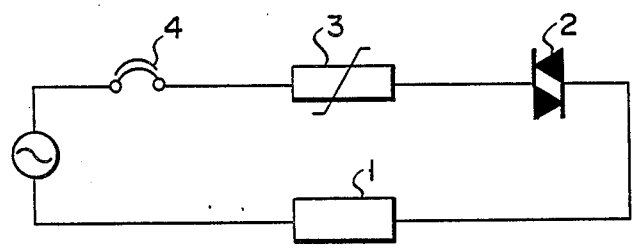
FIG. 1 shows an electric circuit including a protection circuit for a semiconductor device, according to an embodiment of this invention.

In FIG. 1, reference numeral 1 shows a load such as a motor and numeral 2 shows a semiconductor switch which is adapted to turn the load on and off, and which contains, for example, a thyristor. Semiconductor switch 2 has a conduction capacity of 40A and an allowable current/time product ($I^2 \cdot t$) of 3200 A².sec. In this curcuit arrangement, a current-limiting device 3 is comprised of a PTC resistor, and the protection circuit is comprised of a breaker 4. The combination of current-limiting device 3 and the protection circuit is connected in series with semiconductor switch 2.

Figure 2:
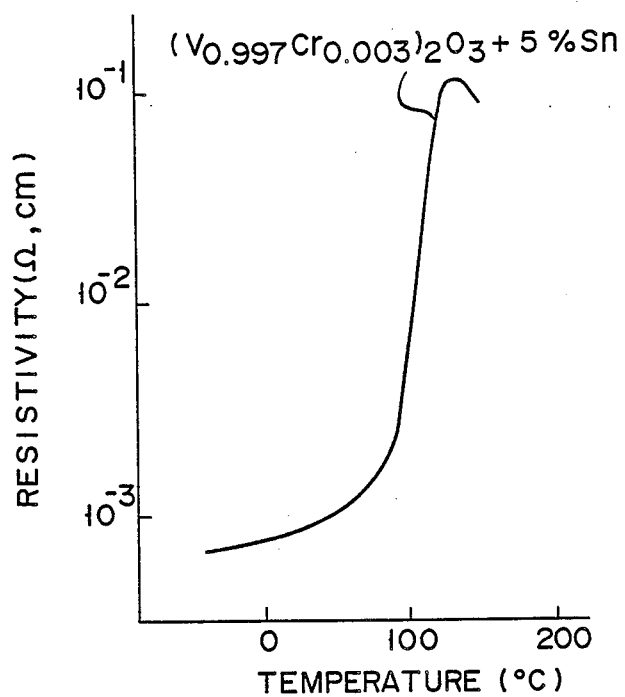
FIG. 2 is a graph showing a variation in resistivity with respect to the temperature of a current-limiting device for use as the protection circuit of FIG. 1.

Current-limiting device 3 is comprised of a ceramics sintered body of a corundum structure having a composition of $$(V_{0.997} Cr_{0.003})_2O_3 + 5\% \text{ Sn}$$

and has a PTC characteristic as shown in FIG. 2. The device has dimensions of 5 mm×5 mm×30 mm and a resistance of around 10 mΩ.

Breaker 4 is of a commercially available high-speed current-limiting type having a rated interruption capacity of 220 V/2.5 kA. This type of breaker uses, in addition to mechanical energizing power,' the magnetic force of a solenoid, so as to open its contacts with a fast response speed.

The operation of the protection circuit according to the embodiment of this invention will be explained below.

In the circuit arrangement shown in FIG. 1, when an overcurrent flows due to an abnormal state of load 1, current-limiting device 3 operates quickly in response thereto, allowing the overcurrent level to be limited to below a predetermined level. The current-limiting device achieves current-limiting within a ¼ cycle due to its very fast response time. If, however, limiting of the overcurrent continues to be performed by current-limiting device 3 alone, a rise in temperature occurs due to the generation of Joule's heat, and thus a fall in resistance occurs, causing the heretofore limited current to again increase. In the aforementioned embodiment, however, high-speed current-limiting breaker 4 begins to operate before the current-limiting effect ceases to exist due to a drop in resistance of current-limiting device 3, whereby the circuit can be interrupted within a ½ cycle. This means that use of the high-speed current-limiting breaker 4 eleminates the appearance of the drawback of the current-limiting device 3, thus performing the current-limiting function more effectively.

As can be seen from the above, according to this invention, current-limiting device 3 of a high-speed response type limits the overcurrent, thereby providing a time allowance until breaker 4 begins to operate. As a result of the improvements current-limiting and interrupting functions of both devices, the current/time product ($I^2 \cdot t$) can be greatly decreased even upon the flow of the overcurrent through the circuit, to enable the electric circuit to be rapidly turned off, so that semiconductor switch 2 can be positively protected. In other words, in order to obtain the effect of this invention, current-limiting device 3 and breaker 4 are both required, and thus, the use of only one of these two devices does not enable semiconductor switch 2 to be protected effectively.

Furthermore, the circuit can be re-established rapidly by closing breaker 4 after current-limiting device 3 has cooled down to the normal operating temperature, thus offering improved operability in comparison with the conventional protection circuit using a quick-break fuse.

The protection circuit according to the embodiment of this invention will now be explained below, in connection with short-circuiting tests, noting that the test are conducted using the same circuit as is shown in FIG. 1. Control tests were also conducted using the circuit, shown in FIG. 1, but from which current-limiting device 3 was eliminated.

In these tests, short-circuiting tests were conducted at 200 V and 3.5 kA. The wave form of short circuiting current is shown by the curve a in FIG. 3.

Figure 3:
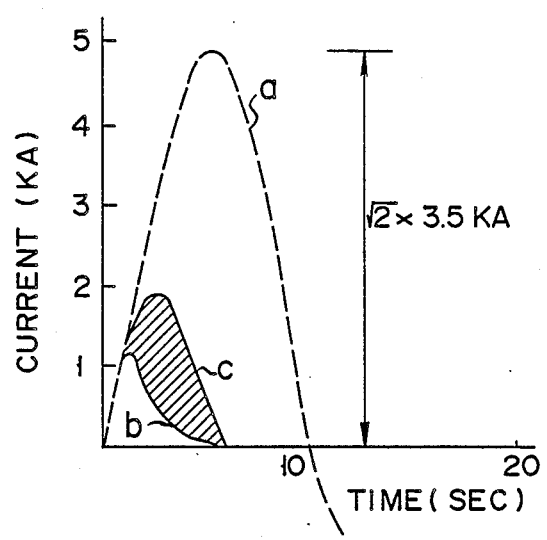
FIG. 3 is a graph showing the result of a short-circuiting test made on the protection circuit shown in FIG. 1.
Figure 4:
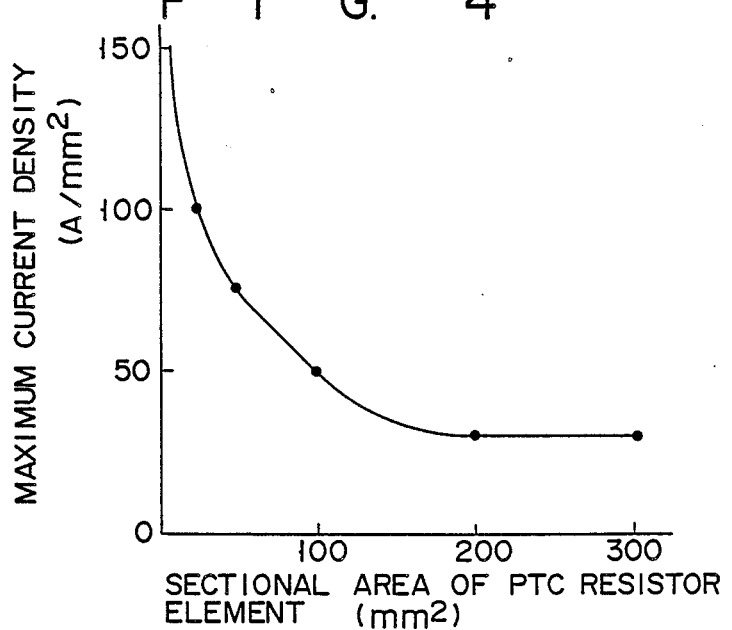
FIG. 4 is a characteristic curve showing a variation in maximum tolerable current density without causing cracking, in relation to the cross-sectional area of PTC resistor elements.

In the control cases, the interruption current waveform as indicated by the curve c in FIG. 3 was obtained, in which case the current/time product ($I^2 \cdot t$) was 8000 A².sec, which greatly exceeds the allowable current/time product (3200 A².sec) of the semiconductor switch incorporated in the circuit. Upon the examination of the semicondutor switch 2 so tested, it has been found that it was destroyed in the "ON" state.

According to this invention, on the other hand, the current-limiting current waveform as indicated by the curve b in FIG. 2 was obtained, in which case the current/time product ($I^2 \cdot t$) was 1900 $A^2$, a value sufficiently lower than the allowable current/time product (3200 $A^2 \cdot t$) of semiconductor switch 2 incorporated in the circuit. That is, according to this invention, it was found that a difference (a shaded portion in FIG. 3) between the interruption current waveform b of this invention and the interruption current waveform c of the Control tests manifests a current-limiting effect ascribable to current-limiting device 3.

It was also found that an additional accompanying effect could be obtained as a result of the current-limiting function of the current-limiting device, whereby it is possible to interrupt a current of above the rated interruption capacity of breaker 4. Upon the examination of semiconductor switch 2 after the tests, it was found to be in sound, faultless condition. The short-circuiting tests were repeated 10 times for the electric circuiting tests were repeated 10 times for the electric circuit of this invention, and it was found that the semiconductor switch was not damaged at all and was completely protected, from the overcurrent, by current-limiting device 3 and high-speed current-limiting breaker 4.

Although the aforementioned embodiment has been explained in connection with the semiconductor switch used as a power semiconductor device, it can also be used for protecting a semiconductor switch used as a power semiconductor device, and it can additionally be used for protecting a semiconductor rectifying device, etc.

A PTC resistor according to this invention will be explained below.

Figure 5A:
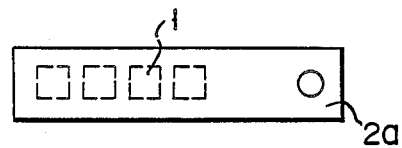
FIGS. 5A and 5B, 6A and 6B show a PTC resistor according to this invention.
Figure 5B:
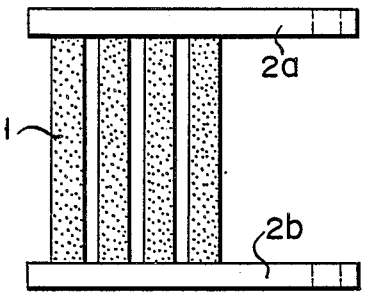

FIGS. 5A and 5B show plan and front views, respectively, of a PTC resistor according to an embodiment of this invention. In these FIGS. 1 ... shows PTC resistor element cut from a sintered body having a composition of $(V_{1-x} A_x)_2O_3$. 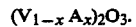

PTC resistor element 1 ... is rectangular in cross-section and has a cross-sectional area of 5 to 10 mm². The PTC resistor element 1 ... is connected between metal electrodes 2a and 2b by either performing a soldering step after the ends of the PTC resistor elements have been metal-plated, or by performing a brazing step with an active metal-containing brazing material sandwiched between the electrodes and the PTC resistor elements.

Figure 6A:
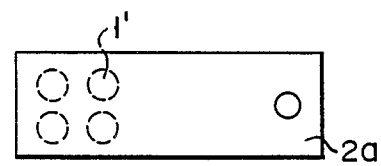
Figure 6B:
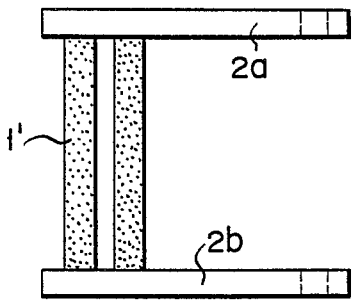

FIGS. 6A and 6B shown plan and front views, respectively, of a PTC resistor according to another embodiment of this invention. In this embodiment, a PTC resistor element 1' ... is exactly the same as in the aforementioned embodiment in FIGS. 5A and 5B, except that these are circular in cross-section.

The manufacturing process of the PTC resistor (the embodiment of FIG. 5) and tests conducted for its resistance to thermal shock will be explained below.

EXAMPLES 1 TO 6

Powdered materials $V_2O_3$, $Cr_2O_3$, $Fe_2O_3$, and $SnO_2$ were mixed together, in order to obtain an eventual composition of $(V_{0.997} Cr_{0.003})_2O_3 + 5\%$ Fe 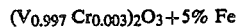

and $(V_{0.997} Cr_{0.003})_2O_3 + 5\%$ Sn, 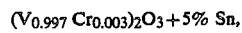

upon being sintered. Then, the mixed materials were crushed on a wet type ball mill for 45 hours and were mixed. Then, the thus-obtained mixture was reduced, while being held in the $H_2$ stream atmosphere at 600° C., for 2 hours. After being further reduced, in the same stream atmosphere at 1000° C. for 3 hours, the resultant mixture was crushed on a wet type ball mill in an acetone solution, for 5 hours, followed by a drying step and press-molding step. The resultant mass was sintered at 1350° to 1500° C., to obtain a $V_2O_3$ ceramics PTC sintered body having dimensions 20 mm × 20 mm × 50 mm.

From this sintered body, PTC resistor elements were manufactured, having various cross-sectional areas, as is shown in Table 1. A plurality of PTC resistor elements were brazed to metal electrodes, to obtain a PTC resistor as shown in FIG. 5.

CONTROLS 1 TO 3

Three types of PTC resistors were obtained by the same method as in Examples 1 to 6, except that use was made of PTC resistor elements having a composition and cross-sectional area as shown in Table 1.

TESTS FOR THERMAL SHOCK

A commercial current of 100 to 10000 A was passed, in only a ½ cycle, through the PTC resistors as obtained in Examples 1 to 6 and Controls 1 to 3. The PTC resistors were then examined for breakage resulting from thermal shock, the results of which are shown in Table 1 below:

TABLE 1

| | Composition | Cross-sectional area (mm²) of PTC resistor element | Number of PTC resistor elements | Conduction current | Breakage of PTC resistor |
|---|---|---|---|---|---|
| Examples | | | | | |
| 1 | $(V_{0.997}Cr_{0.003})_2O_3 + 5\%$ Sn | 100 | 2 | 10 | No breakage |
| 2 | " | 50 | 4 | 10 | No breakage |
| 3 | " | 20 | 10 | 10 | No breakage |
| 4 | " | 5 | 20 | 10 | No breakage |
| 5 | $(V_{0.997}Cr_{0.003})_2O_3 + 5\%$ Fe | 50 | 4 | 10 | No breakage |
| 6 | " | 20 | 10 | 10 | No breakage |
| Controls | | | | | |

TABLE 1-continued

| | Composition | Cross-sectional area (mm²) of PTC resistor element | Number of PTC resistor elements | Conduction current | Breakage of PTC resistor |
|---|---|---|---|---|---|
| 1 | " | 300 | 1 | 9 | Breakage |
| 2 | " | 200 | 1 | 6 | " |
| 3 | $(V_{0.997}Cr_{0.003})_2O_3 + 5\%$ Sn | 200 | 1 | 6 | " |

As is evident from the results of the tests, the PTC resistors as obtained in Examples 1 to 6 suffer no breakage at a conduction current up to 10000 A and exhibit excellent resistance to thermal shock. In contrast, the PTC resistors as obtained in Controls become damaged at a low current level since the cross-sectional area range of the PTC resistor elements is greater than that formed according to this invention.

What is claimed is:

1. A protective circuit including a power semiconductor device, comprising a circuit breaker and a current-limiting device which form a series connection, said breaker operating independently of said current-limiting device, said series connection being connected in series with said power semiconductor device to be protected, and said current-limiting device being made of a ceramic PTC resistor whose composition is represented by:

$$(V_{1-x}A_x)_2O_3$$

where
A is one element selected from the group consisting of Cr, Al and Sc; and
x is a molar ratio of $0 \leq x \leq 0.02$.

2. The protective circuit according to claim 1, wherein said ceramic PTC resistor contains less than 20% by weight of at least one element of Fe, Ni, Co, Cu and Sn.

3. The protective circuit according to claim 2, wherein said circuit breaker is of a high-speed current-limiting type.

4. The protective circuit according to claim 1, wherein said circuit breaker is of a high-speed current-limiting type.

5. The protective circuit according to claim 1, wherein said current-limiting device comprises PTC resistor elements having said composition, said PTC resistor elements providing a parallel combination and having a cross-sectional area each of 5 to 100 mm².

6. The protective circuit according to claim 5, wherein said PTC resistor elements contain less than 20% by weight of at least one element of Fe, Ni, Co, Cu and Sn.

7. The protective circuit according to claim 1, wherein in the event of an overcurrent, the current limiting device decreases the current by an increase in resistance, said breaker also operating to open the circuit after the current has been reduced by the current-limiting device but before the characteristics of the current-limiting device change due to heating.

8. A protective circuit including a power semiconductor device, comprising a circuit breaker and a current-limiting device which form a series connection, said breaker operating independently of said current-limiting device, said series connection being connected in series with said power semiconductor devices to be protected, and said current-limiting device being made of a ceramic PTC resistor whose composition is represented by:

$$(V_{1-x}A_x)_2O_3$$

where
A is one element selected from the group consisting of Cr, Al and Sc; and
x is a molar ratio of $0 \leq x \leq 0.02$,
said ceramic PTC resistor further containing less than 20% by weight of Sn.

9. The protective circuit according to claim 8, wherein said current-limiting device comprises PTC resistor elements having said composition, said PTC resistor elements providing a parallel combination and having a cross-sectional area each of 5 to 100 mm².

10. The protective circuit according to claim 8, wherein said circuit breaker is of a high-speed current-limiting type.

* * * * *